FIG. I

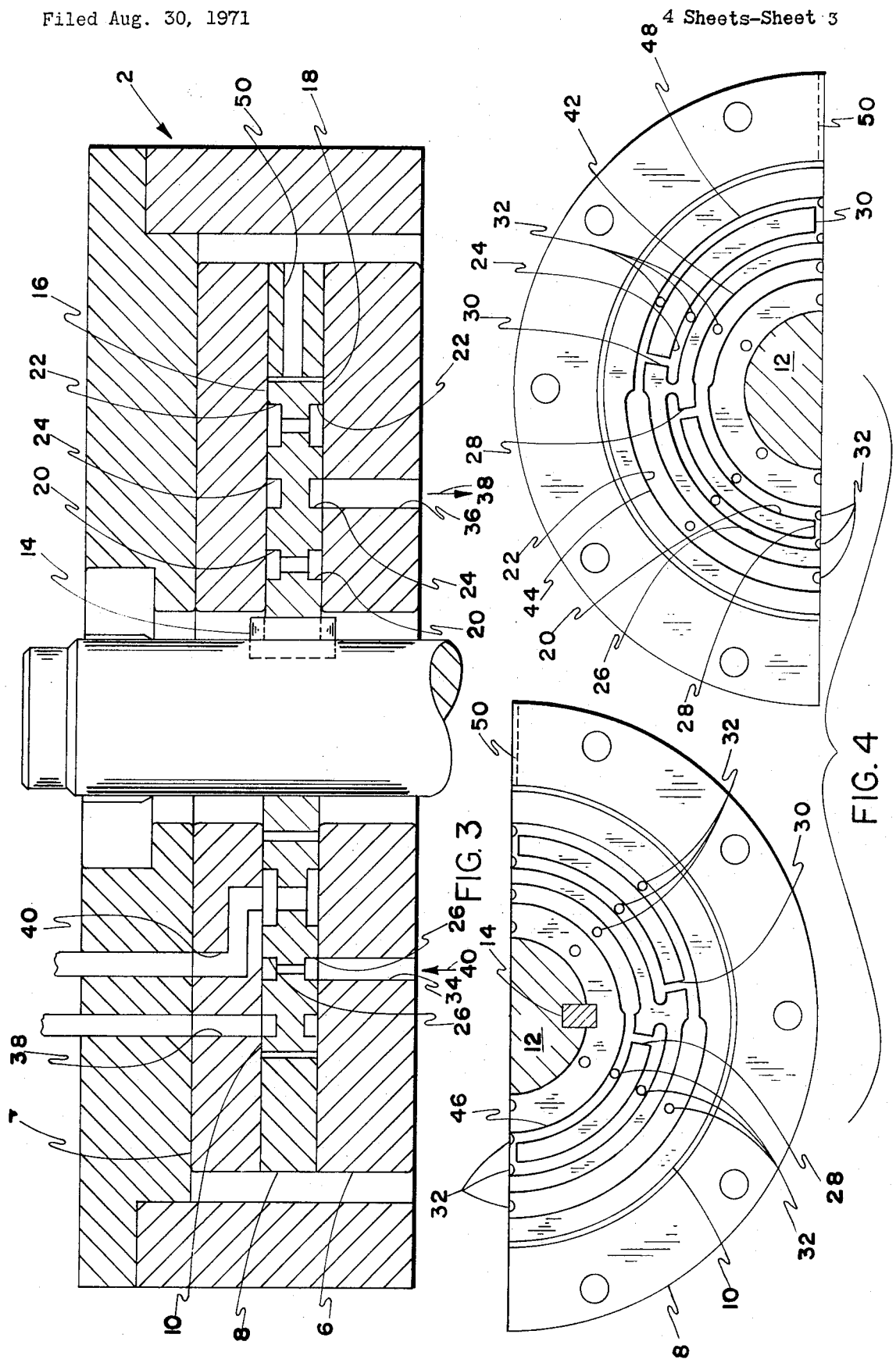

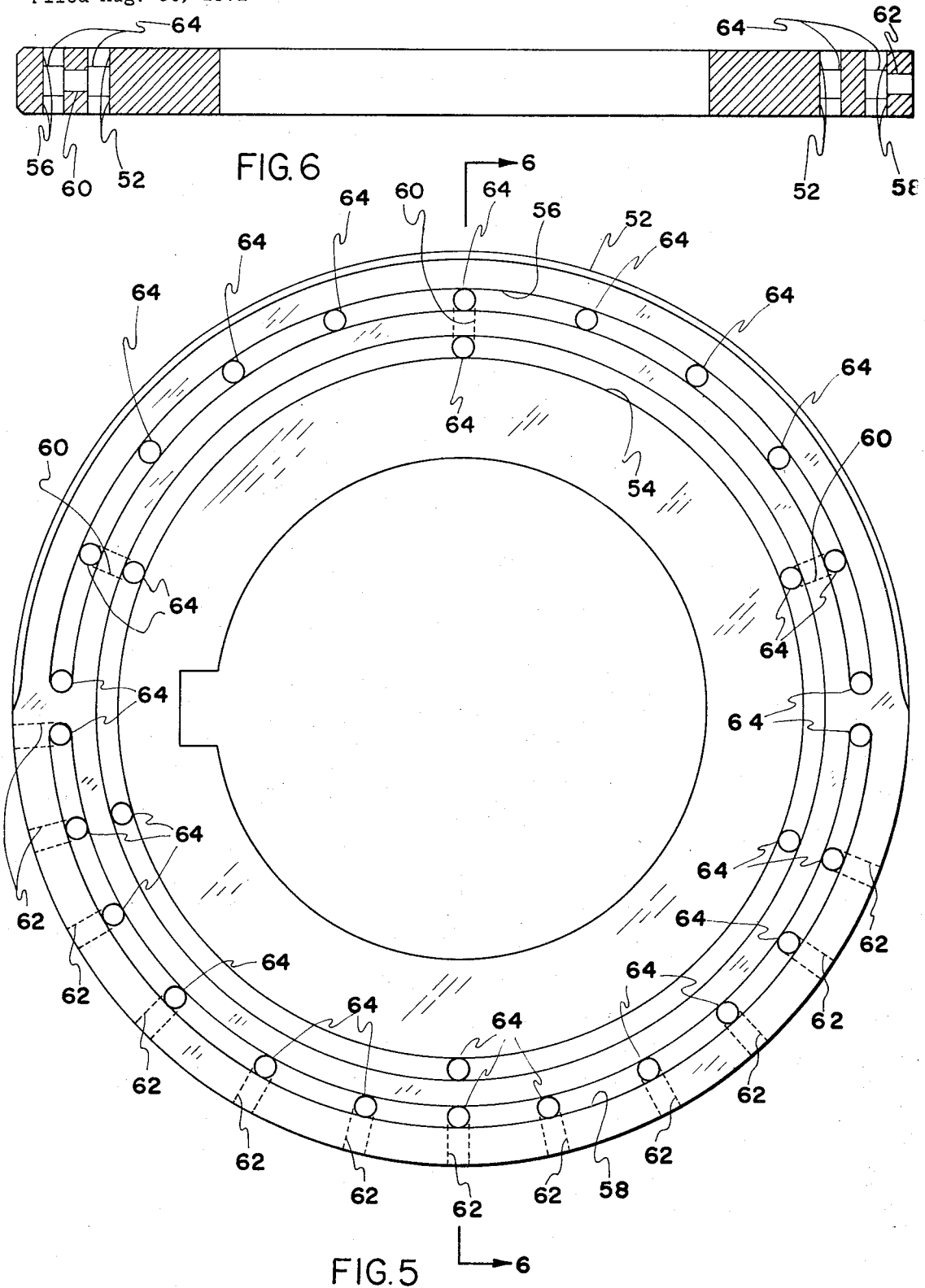

United States Patent Office 3,702,143
Patented Nov. 7, 1972

3,702,143
KIDNEY VALVE FOR FLUID MOTOR AND OTHER USES
Norman L. Van Wagenen, 378 E. Truman Ave., Salt Lake City, Utah 84115, and Ara Norman Lamph, 540 North 200 East, Bountiful, Utah 84010
Continuation-in-part of abandoned application Ser. No. 740,414, May 23, 1968, which is a division of application Ser. No. 607,428, Jan. 5, 1967, now Patent No. 3,420,059. This application Aug. 30, 1971, Ser. No. 175,853
Int. Cl. F16k *11/02*
U.S. Cl. 137—625.21                                    13 Claims

ABSTRACT OF THE DISCLOSURE

A fluid control system comprising a kidney valve formed with a pair of concentric recesses and a plurality of semi-circular recesses disposed in opposing relation and connected to respective ones of said circular recessses. Two forms of said valve are disclosed.

BACKGROUND

Field of invention

This invention relates to fluid control means and is particularly directed to novel kidney valve means for controlling the flow of driving fluids in fluid motors and the like.

Continuity

This invention is a continuation-in-part of our copending U.S. patent application Ser. No. 740,414, filed May 23, 1968, now abandoned which is a division of U.S. patent application Ser. No. 607,428, filed Jan. 5, 1967, now U.S. Pat. No. 3,420,059.

PRIOR ART

Fluid control systems including valves are widely used in hydraulic application, fluid logic systems, servo controls, fluid motors, and the like. The use of fluid motors is widely known for rotating large revolving signs, radar antennas, and the like. Moreover, fluid motors require valve systems to regulate and direct the flow of driving fluid therethrough and many of the previous fluid motors have empolyed reciprocating or piston-type valves. However, valves of this type require valve housings and cylinders which are relatively bulky and expensive to produce. Other prior art fluid motors have employed rotating kidney-type valves, having one or more arcuate recesses formed in one surface thereof to control passage of fluid into and out of respective conduits which are placed in or out of communication with the recesses by rotation of the valve. Unfortunately, the flow of fluid through the recesses of the prior art kidney valves has applied a unidirectional force to the valve causing the valve to bear against the valve housing and has presented considerble friction.

BRIEF SUMMARY AND OBJECTS OF THE INVENTION

These disadvantages of the prior art are overcome with the present invention and a kidney-type valve is provided which prevents the application of unidirectional pressure to the valve and, thus, minimizes friction between the valve and valve housing.

The advantages of the present invention are preferably attained by providing a kidney-type valve having corresponding recesses formed in the opposite surfaces thereof with apertures communicating with the corresponding recesses to cause pressure resulting from fluid flow through the valve to be applied substantially equal on both surfaces of the valve.

Accordingly, it is an object of the present invention to provide an improved fluid control means.

Another object of the present invention is to provide an improved kidney valve for use in fluid control systems.

An additional object of the present invention is to provide means for preventing fluid flowing through a kidney valve from applying a unidirectional force against the valve.

A further object of the present invention is to provide means for preventing fluid flowing through a kidney valve from forcing the valve to frictionally bear against the valve housing.

A specific object of the present invention is to provide a kidney valve having corresponding recesses formed in the opposite surfaces of the valve together with apertures communicating with the complementary recesses to cause pressure resulting from fluid flow through the valve to be applied substantially equal on both surfaces of the valve.

These and other objects and features of the present invention will be apparent from the following detailed description, taken with reference to the accompanying drawings.

BRIEF DESCRIPTION OF THE DRAWINGS

FIG. 3 is a vertical section through a modified form of the fluid control system of FIG. 1;

FIG. 4 is a plan view of the kidney valve of the fluid motor of FIG. 3; and

FIG. 5 is a plan view of a modified from of the kidney valve of FIG. 3; and

FIG. 6 is a transverse section of the valve of FIG. 5.

DETAILED DESCRIPTION OF THE ILLUSTRATED EMBODIMENTS

Figure 1:
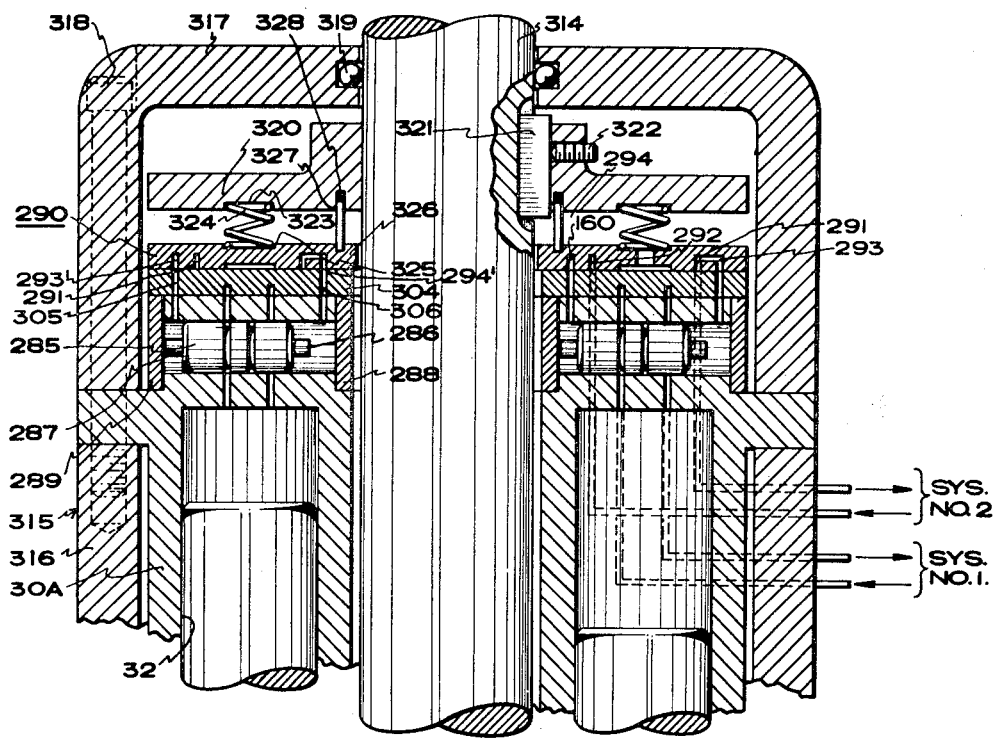
FIG. 1 is a vertical section through a fluid control system embodying the present invention.
Figure 2:
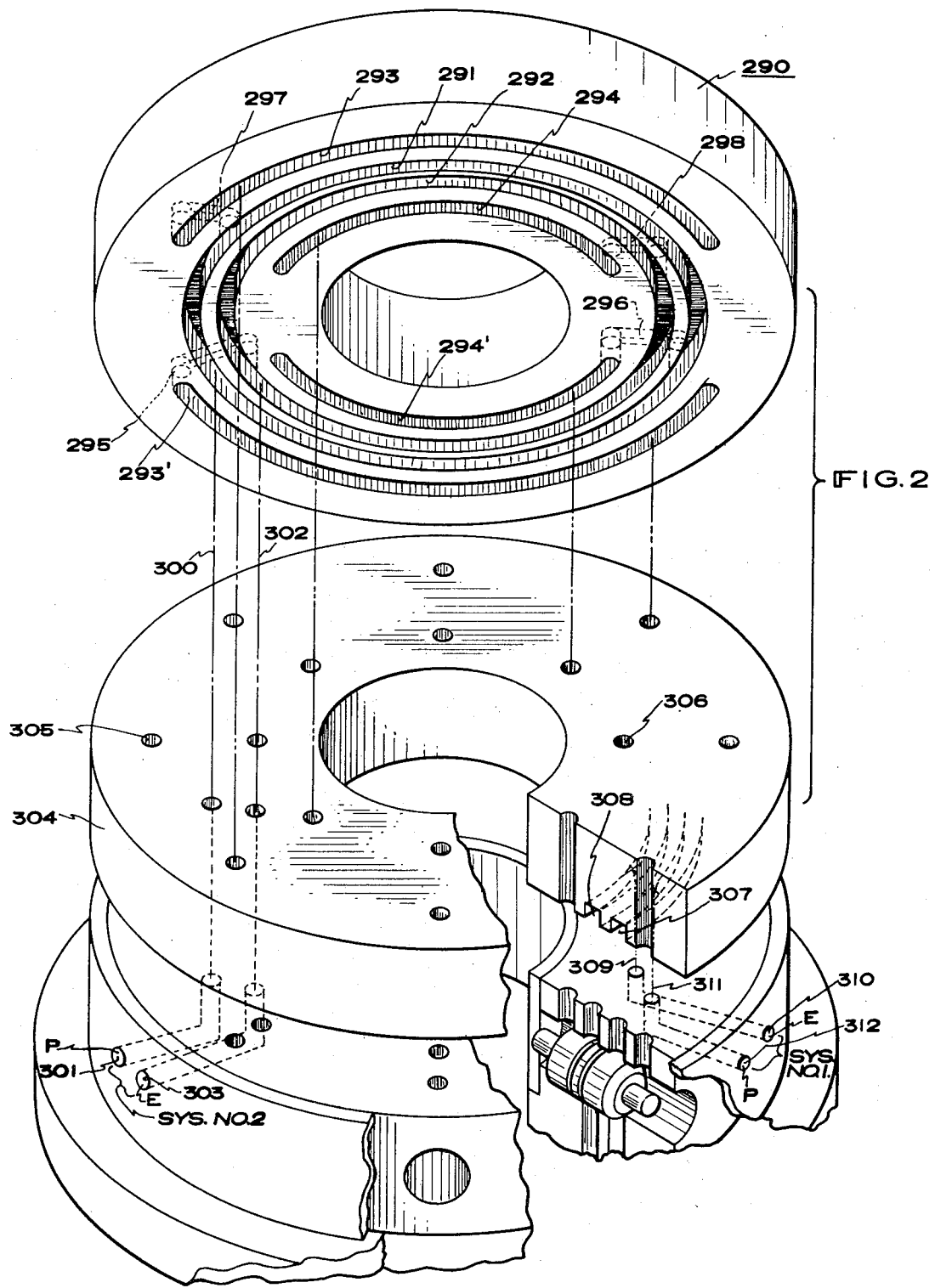
FIG. 2 is a perspective exploded view showing the valve structure of FIG. 1.

FIGS. 1 and 2 illustrate a central portion of a fluid motor wherein two separate hydraulic or pneumatic systems are supplied, one to apply pressure to and receive exhaust from the pressure cylinders 34 and the remaining system to control the disposition of control valve spools 285. The individual spools may have extremities 286 and 287 which operate as stop abutments cooperating with internal and external rings 288 and 289 in the housing structure. Except for this, the construction of the cylinder block, valve portions and manifold is substantially identical to that illustrated in FIGS. 23–25 of our U.S. Pat. No. 3,420,-059, issued Jan. 7, 1969, with the exception that the manifold grooving is modified and cooperates with a rotating kidney valve plate 290.

In referring to FIG. 2 it is seen that the rotating kidney valve plate 290 includes annular passageway slots 291 and 292 and two pairs of kidney-shaped slots, i.e. 293, 293', 294 and 294'.

Passageway 295 interconnects groove 292 with kidney slots 293'. Correspondingly, passageway 296 supplies intercommunication between kidney slot 294' and annular groove 291. In a similar manner passageway 297 provides communication between kidney slot 293 and annular groove 291. And passageway 298 supplies communication between annular groove 292 in kidney slot 294. The kidney slots illustrated are preferably approximately 150° in arcuate extent and are mutually opposite each other; thus, and assuming there are eight cylinders in the motor, three of the cylinders will be on pressure at any one particular time in the cycle, whereas the three opposite cylinders will be at exhaust condition. The annular rings 291 and 292 are simply manifold rings, with 291 being a pressure groove communicating through aligned passageways 300 to the pressure intake at 301. Correspondingly, aligned passageways 302 offer communciation between annular groove 292 and exhaust 303.

It is seen that the manifold ring 304 is provided with a plurality of holes 305 and 306 and also a pair of annular grooves 307 and 308 on the underside thereof. Groove 308 communicates with aligned passageways 309 to exhaust 310 of the other fluid system, whereas groove 307 communicates via passageway means 311 to the pressure side 312.

The annular grooves 307 and 308 serve as manifold rings for system #1 which is a hydraulic or pneumatic system supplying pressure to and returning exhaust from the pressure cylinders 34. In contrast, the manifold grooves 291 and 292 of the rotating kidney valve supply hydraulic pressure for and return exhaust from the areas of the control valves approximate the outer ends of the valve spool 285. Thus, system #2 is a control system for controlling the movement back and forth of the various, mutually spaced, concentrically related spool values, i.e. related to the axis of the output shaft 314.

As to makeup of the remainder of the structure, the composite housing 315 includes the cylinder block 30A, the outer housing 316, and also an upper end bell 317 which is bolted by bolts 318 to the remainder of the structure as illustrated in FIG. 1. An oil seal 319 is mounted within bell 317 to seal the rotating shaft 324. A pressure plate 320 is keyed by key 321 to shaft 324 and is locked in place by set screw 322. A plurality of spring seats take the form of counter bore areas 323 and are mutually spaced about the lower surface of the pressure plate 320. Springs 324 are mounted therein and are also mounted at the opposite extremities to spring seats 325 of the rotating kidney valve plate 326. Pins 327 and the pin springs 328 serve as a loose intercoupling means between the pressure plates and the rotating kidney valve plate.

In operation, the structure of FIGS. 1 and 2 functions, by virtue of the annular groove and kidney passageways in the kidney valve plate, which rotates in accordance with the rotation of shaft 324, to produce an alternate powering of opposite extremities of the shuttle valves 285 in FIG. 1 so that one of the valves admits pressure to the cylinder 32 (on the right) whereas the spool of an opposite control valve is translated in the opposite direction, so that fluid exhausted from the rising piston on the opposite side of the structure is caused to pass to the exhaust system. It is seen in FIG. 2 that annular groove 292 and kidney passageway 293' function with the exhaust, system #2, whereas the annular groove 291 and kidney passage 294' function on the pressure side. This allows for the progressive positioning of the control valve shuttles 285 to their pressure, and subsequently to their exhaust conditions as the shaft 314 and kidney valve 290 continue their rotation.

FIGS. 3 and 4 illustrate an alternative form of the present invention. This form of the invention provides a highly balanced, smoothly operating kidney valve which is capable of use at their high or very low speeds. In this form of the invention, the flow control system, indicated generally at 2, comprises an upper plate 4, a lower plate 6, an annular ring 8 and a generally disc-shaped kidney valve 10 which is secured for rotation with a shaft 12 by suitable means, such as key 14.

It will be seen that valve 10 is a circular disc having an upper surface 16 and a lower surface 18. The surfaces 16 and 18 are identical and are each formed with an inner circular recess 20, one outer circular recess 22 and a pair of opposed semi-circular recess 24 and 26. As shown, the recess 20, 22, 24 and 26 are concentric and semi-circular recesses 24 and 26 are interposed between circular recesses 20 and 22. As seen in FIG. 4, inner circular recess 20 is connected to semi-circular recess 26 by a plurality of radial channels 28. Similarly, outer circular recess 22 is connected of the opposite semi-circular recess 24 by radial channels 30. Moreover, a plurality of apertures 32 are provided to communicate the recesses 20, 22, 24 and 26 of surface 16 with the corresponding recesses of surface 18.

The lower plate 6 of the fluid control unit 2 is formed with conduits 34 and 36 which serve as influent and effluent ports for the apparatus to be controlled and which communicate with one or the other of the semi-circular recesses 24 and 26 of valve 10, depending on the rotational position of valve 10. Upper plate 4 of flow control device 2 is formed with fluid conduits 38 and 40. Conduit 38 supplies pressurized fluid from a suitable source, not shown, to the outer circular recess 22 of valve 10, while conduit 40 communicates the inner circular recess 20 of valve 10 with a suitable reservoir, not shown.

In use, pressurized fluid is supplied through conduit 38 to the outer circular recess 22 of surface 16 of valve 10 and flows through channels 30 to semi-circular recess 24. Also, the fluid flows through apertures 32 to the corresponding recesses 22 and 24 of surface 18 of valve 10 so that the pressure on surfaces 16 and 18 of valve 10 are equal. As seen in FIG. 3, recess 24 of surface 18 of valve 10 is in communication with conduit 36 of lower plate 6 and, thus, passes pressurized fluid to the device to be controlled, as indicated by arrow 38. Meanwhile, effluent fluid flows through conduit 34, as indicated by arrow 40, to semi-circular recess 26 of surface 18 of valve 10. The fluid then flows through channels 28 to inner circular recess 20 and through apertures 32 to the corresponding recesses 20 and 26 of surface 16 of valve 10. From inner circular recess 20 of surface 16, the fluid flows through effluent conduit 40 of upper plate 4 to a suitable reservoir.

It will be seen that the corresponding recesses in surfaces 16 and 18 of valve 10 serve to assure that the fluid pressure on both surfaces 14 and 18 of valve 10 will be equal. Moreover, as seen in FIG. 4, the circular recesses 20 and 22 are formed with semi-circular portions 42 and 44, respectively, of enlarged dimensions. Preferably, the dimensions of enlarged portion 42 of the inner circular recess 20 are equal to the total of the dimensions of the small portion 46 of recess 20 plus the dimensions of semi-circular recess 26 and channels 28. Similarly, the dimensions of the enlarged portion 44 of outer circular recess 22 are equal to the total of the dimensions of the small portion 48 of recess 22 plus the dimensions of semi-circular recess 24 and channels 30. This assures that the valve 10 will be balanced and provides for smoother and more efficient operation, especially at high speeds.

If desired, a radial port 50 may be provided through ring 8 to provide an exhaust port for fluid leakage which may occur between valve 10 and plates 4 and 6.

FIG. 5 illustrates a modified form of kidney valve 52 having a single circular recess 54 and a pair of semi-circular recesses 56 and 58. A plurality of radial conduits 60 connect circular recess 54 with semi-circular recess 56, while additional radial conduits 62 communicate semi-circular recess 58 with the exterior of the valve 52. Preferably, corresponding recesses are formed on the opposite surface of the valve 52 and apertures 64 are provided to permit fluid communication between the corresponding recesses. If desired, the edges of valve 52 adjacent semi-circular recess 56 may be bevelled for balance, as seen at 66.

In use, pressurized fluid is supplied through circular recess 54, radial conduits 60, semi-circular recess 56, and apertures 64 to supply driving fluid to the cylinders of the fluid motor. Exhaust fluid flows through apertures 64, semi-circular recess 58, and radial conduits 62 and is vented about the periphery of the valve 52. A ring, such as ring 8 of FIGS. 3 and 4 may be employed about the valve 52 to allow the vented fluid to escape through port 50 to the exterior of the motor.

In addition, numerous other variations and modifications may be made without departing from the present invention. Accordingly, it should be clearly understood that the form of the present invention described above and shown in the accompanying drawing is illustrative only and is not intended to limit the scope of the invention.

What is claimed is:

1. A kidney valve for controlling fluid distribution comprising:
    a generally flat, circular disc,
    inner and outer circular recess formed concentrically in at least one surface of said disc,
    a plurality of substantially semi-circular recesses formed in said surface concentric with said circular recesses,
    first fluid communication means connecting said inner circular recess with at least one of said semi-circular recesses, and
    second fluid communication means connecting said outer circular recess with at least one other of said semi-circular recesses.

2. A fluid control system comprising:
    a generally flat, circular disc,
    inner and outer circular recesses formed concentrically in at least one surface of said disc,
    a plurality of substantially semi-circular recesses formed in said surface concentric with said circular recesses,
    first fluid communication means connecting said inner circular recess with at least one of said semi-circular recesses,
    second fluid communication means connecting said outer circular recess with at least one other of said semi-circular recesses,
    a source of pressurized fluid supplying fluid to one of said circular recesses,
    reservoir means exhausting fluid from the other of said circular recesses,
    means for rotating said disc, and
    a plurality of fluid conduit means communicable with said semi-circular recess upon rotation of said disc to pass fluid to and from said disc and a device to be controlled.

3. The device of claim 2 wherein:
    the number of said semi-circular recesses is four,
    a first pair of said semi-circular recesses being disposed in opposing relation interiorly of said inner circular recess,
    a second pair of said semi-circular recesses being disposed in a opposing relation exteriorly of said outer circular recess,
    said first fluid communication means connects said inner circular recess with one of the semi-circular recesses of each of said pairs, and
    said second fluid communication means connects said outer circular recess with the other semi-circular recess of each of said pairs.

4. The device of claim 3 wherein:
    the semi-circular recesses connected by said first fluid communication means to said inner circular recess are located in opposing relation, and
    the semi-circular recesses connected by said second fluid communication means to said outer circular recess are located in opposing relation.

5. The device of claim 2 wherein:
    said semi-circular recesses are interposed between said circular recesses in opposing relation.

6. The device of claim 5 wherein:
    said circular recesses are formed with enlarged portions extending substantially semi-circularly thereof and are disposed with the enlarged portion of said inner circular recess in opposing relation with the enlarged portion of said outer circular recess and in opposing relation with at least one of said semi-circular recesses.
    said first fluid communication means connects said inner circular recess with said one of said semi-circular recesses, and
    said second fluid communication means connects said outer circular recess with a semi-circular recess disposed in opposing relation with said one of said semi-circular recesses.

7. The device of claim 6 wherein:
    the dimensions of said enlarged portion of each of said circular recesses are equal to the total of the dimensions of the small portion of the respective one of said circular recesses plus the dimensions of the semi-circular recess connected thereto and the dimensions of the associated one of said fluid communication means.

8. The device of claim 2 further comprising:
    a corresponding set of recesses formed in the opposite surface of said disc, and
    third fluid communication means connecting each of the recesses in said one surface with at least one of the recesses in said opposite surface.

9. The device of claim 8 wherein:
    said third fluid communication means connects each of said recesses in said one surface with the corresponding recess in said opposite surface.

10. The device of claim 2 further comprising:
    a first plate disposed adjacent one surface of said disc and having a fluid influent conduit extending therethrough and communicating said source of pressurized fluid with one of said circular recesses and a fluid effluent conduit extending through said first plate and communicating said reservoir with the other of said circular recesses,
    a second plate disposed adjacent the opposite surface of said disc and formed with at least one fluid conduit extending therethrough and communicating with at least two of said semi-circular recesses during each rotation of said disc to pass fluid to and from a device to be controlled, and
    an annular ring interposed between said first and second plates and circumscribing said disc.

11. The device of claim 10 further comprising:
    a fluid conduit communicating the interior and exterior of said ring to permit discharge of fluid leaking between said disc and either of said plates.

12. A kidney valve for controlling fluid distribution comprising:
    a generally flat, circular disc,
    a plurality of substantially semi-circular recesses formed in said surface,
    a circular recess formed in said surface,
    means communicating said circular recess with one of said semi-circular recesses, and
    means for exhausting fluid from another of said semi-circular recesses.

13. The valve of claim 12 wherein:
    said last named means comprises radial conduits communicating said other of said semi-circular recesses with the exterior of said valve.

References Cited

UNITED STATES PATENTS 2,600,099   6/1952   Detrez ---------- 137—625.21

HENRY T. KLINKSIEK, Primary Examiner